3,246,964
FUEL AND LUBE COMPOSITIONS
Jerome E. Brown, Baton Rouge, Hymin Shapiro, East Baton Rouge, and Earl G. De Witt, Baton Rouge, La., assignors to Ethyl Corporation, New York, N.Y., a corporation of Virginia
No Drawing. Filed June 3, 1963, Ser. No. 284,837
The portion of the term of the patent subsequent to Dec. 31, 1974, has been disclaimed
2 Claims. (Cl. 44—68)

This invention relates to improved fuel and lubricant compositions and more particularly to improved fuels, lubes and additive fluids for use in the operation of a spark ignition internal combustion engine.

But for a few noteworthy substances such as tetraethyllead and iron carbonyl, the state of the art has not advanced sufficiently to permit the preparation and isolation of "tailormade" organometallic substances having the necessary characteristics of stability, volatility and solubility. It is evident, therefore, that the state of the art will be greatly enhanced by providing a class of organometallic compounds capable of being modified to meet the requirements of fuel and oil additives.

It is an object of this invention to provide improved fuels for spark ignition internal combustion engines. Another object is to provide an improved fuel containing a particular class of organometallic compounds as additives. A further object is to provide fluids for addition to fuels to improve the combustion characteristics thereof. Another object is to provide fuel compositions which give improved operating characteristics with a minimum of engine wear.

In our prior application, Serial No. 325,224, filed December 10, 1952, now U.S. Patent 2,818,416, of which the present application is a continuation-in-part through linking applications Serial No. 698,905, filed November 26, 1957, now abandoned, Serial No. 193,849, filed May 10, 1962, now abandoned, and Serial No. 703,762, filed December 19, 1957, now abandoned, we have described and claimed a new class of metallic cyclomatic compounds as well as methods for their preparation. The new class of compounds of our application, Serial No. 325,224, is therein defined as having the general formula $MA_xB_yC_z$ wherein M is a metal, A is a cyclomatic hydrocarbon radical, and each of B and C can be the same or different and is an electron donating group different from a cyclomatic radical such that $a_n$ plus $5x$ plus $py$ plus $qz$ equals $S$, wherein S is the atomic number of an inert gas of the $n$th period, $x$ is a small whole integer from 1 to 2 inclusive, $y$ is a small whole integer from 1 to 4 inclusive, $z$ is a small whole integer from 0 to 4 inclusive, $n$ is a period of the Periodic Table and is greater than 1, $p$ and $q$ are the number of electrons donated by B and C respectively, and $a_n$ is the atomic number of M and is defined such that $a_n$ is within the parameters $(S_{n-1}+1)$ and $(S_n-6)$.

Reference to the above generic formula indicates that there are three primary constituents of these compositions of matter. These are the metallic constituents designated as M, the cyclomatic hydrocarbon radical designated as A, and a different electron donating group designated as B. In certain embodiments of these novel cyclomatic compounds there are two different electron donating groups, B and C.

The present invention is directed to the use of certain of the compounds of our aforementioned parent application as additives for fuels used in present-day spark-fired internal combustion engines and as additives to lubricants. These particular compounds constitute compositions of the above general formula wherein the metallic constituent M is nickel.

The second primary constituent of the new composition of matter of the present invention designated by the symbol A in the formula presented hereinbefore comprises a cyclomatic radical, that is, a cyclopentadiene-type hydrocarbon radical which is a radical containing the cyclopentadienyl moiety. In general, such cyclomatic hydrocarbon groups can be represented by the formulae:

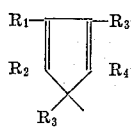 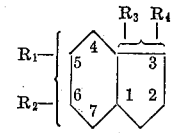

where the R's are selected from the group consisting of hydrogen and univalent organic hydrocarbon radicals.

A preferred class of cyclomatic radicals suitable in the practice of this invention are those which contain from 5 to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. The compounds which yield these radicals are preferred as they are the more readily available cyclomatic compounds and the metallic cyclomatic coordination compounds obtainable from them have the more desirable characteristics of volatility and solubility which are prerequisites of superior hydrocarbon additives.

The third primary constituent of the compounds used in the present invention is designated as an electron donating group other than a cyclopentadienyl containing radical. This electron donating group is the nitrosyl group, NO. The nitrosyl group donates three electrons to the central nickel atom.

An embodiment of the present invention comprises a liquid hydrocarbon fuel for spark ignition internal combustion engines containing from about .05 to about 10 grams per gallon of nickel as a cyclopentadienyl nickel nitrosyl coordination compound having the formula NiANO. It is found that when such compositions are employed in the operation of a spark ignition internal combustion engine antiknock and antiwear advantages are achieved which are impossible in compositions which do not contain the cyclopentadienyl nickel nitrosyl coordination compound. Indeed, antiknock effects are found when the nickel concentration is even lower, as 0.01 gram per gallon.

A preferred composition of the present invention comprises a composition containing from 1.0 to about 6.0 grams of nickel per gallon of fuel as a cyclopentadienyl nickel nitrosyl coordination compound as defined above. This range of nickel concentration is preferred as it is found that superior fuels result from its employment.

A particular advantage of the additives of the present invention is the fact that by proper selection of the individual coordinating cyclopentadienyl group, compounds having "tailormade" characteristics can be obtained. Thus, by the proper selection of the cyclomatic group, it is possible to prepare compounds possessing differing degrees of stability, volatility and solubility. Likewise, the selection of these constituents also enables the preparation of compounds of applicability in diverse fuels.

In providing fuel compositions of this invention superior results are often obtained by including in the fuel mixtures of compounds. Thus fuels having superior antiknock and antiwear characteristics are obtained when a mixture of two different cyclopentadienyl nickel nitrosyl coordination compounds as defined above are included therein.

The base fuels employed to prepare the compositions of this invention have a wide variation of compositions. These fuels generally are petroleum hydrocarbons and are usually blends of two or more components containing a mixture of many individual hydrocarbon compounds. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbons, including thermally cracked, catalytically cracked, reformed fractions, etc. When used for spark-fired engines, the boiling range of the components of gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at particular intermediate temperatures.

These fuels often contain minor quantities of various impurities. One such impurity is sulfur, which can be present either in a combined form as an organic or inorganic compound, or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

To demonstrate the effectiveness of hydrocarbon fuels blended with cyclopentadienyl nickel nitrosyl coordination compounds according to this invention, tests were made on fuels to which no antiknock agent was added and fuels which were blended in accordance with this invention. These tests were conducted according to the Research Method. The Research Method of determining octane number of a fuel is generally accepted as a method of test which gives a good indication of fuel behavior in full scale automotive engines under normal driving conditions and is the method most used by commercial installations in determining the value of a gasoline additive. The Research Method of testing antiknocks is conducted in a single cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D-908-55 contained in the 1956 edition of "ASTM Manual of Engine Test Methods for Rating Fuels." The fuel employed in these tests was a synthetic mixture which is representative of commercial gasolines in present production and was used since it gives a standard antiknock response and predictable reproducibility. This mixture consists of 20 volume percent diisobutylene, 20 volume percent toluene, 20 volume percent isooctane and 40 volume percent n-heptane. When this fuel contained no antiknock additive it had a research octane number of 91.3. Table I below shows the octane number achieved with the addition of an additive compound employed in this invention. These data indicate that substantial gains in octane number are provided by the compounds used in the practice of this invention.

TABLE I

| Additive | Grams of metal/gal. | Octane Number |
|---|---|---|
| $C_5H_5NiNO$ | 1.0 | 93.8 |
|  | 2.0 | 95.0 |
| No additive |  | 91.2 |

Further examples of the antiknock effectiveness of cyclopentadienyl nickel nitrosyl in fuels of varying composition and clear octane number are given in Table II. In some fuels, not only the Research octane gains, but also the Motor method octane gains (ASTM D-357) are given. Representative results for methylcyclopentadienyl nickel nitrosyl by both methods are presented in Table III. Results obtained with the other cyclopentadienyl nickel nitrosyl compounds of this invention are comparable to these.

TABLE II.—ANTIKNOCK EFFECTIVENESS OF CYCLOPENTADIENYL NICKEL NITROSYL

| Research Octane Number, g. Ni/gallon of fuel | | | | | | Motor Octane Number, g. Ni/gallon of fuel | | | | | |
|---|---|---|---|---|---|---|---|---|---|---|---|
| 0 | 0.125 | 0.25 | 0.5 | 1.0 | 2.0 | 0 | 0.125 | 0.25 | 0.5 | 1.0 | 2.0 |
| 93.6 | -------- | 97.2 | 98.8 | 101.2 | 104.8 | 91.2 | -------- | 93.4 | 94.9 | 96.2 | 99.6 |
| 94.4 | -------- | 99.3 | 101.0 | 103.0 | 105.6 | 92.4 | -------- | 96.5 | 98.7 | 100.1 | 101.3 |
| 90.5 | -------- | -------- | 96.6 | 98.7 | 101.2 | -------- | -------- | -------- | -------- | -------- | -------- |
| 98.0 | -------- | 99.6 | 99.8 | 100.2 | 100.4 | 86.7 | -------- | 87.1 | 87.3 | 87.4 | 87.5 |
| 91.1 | -------- | 93.1 | 94.4 | 95.6 | 97.2 | 84.2 | -------- | 86.0 | 86.7 | 87.3 | 87.9 |
| 87.2 | 91.8 | 93.7 | 95.8 | 98.4 | -------- | -------- | -------- | -------- | -------- | -------- | -------- |
| 91.3 | 93.7 | 94.5 | 95.4 | 96.8 | -------- | -------- | -------- | -------- | -------- | -------- | -------- |
| 90.0 | 93.1 | 95.0 | 96.8 | 98.2 | -------- | -------- | -------- | -------- | -------- | -------- | -------- |
| 92.4 | 95.5 | 97.0 | 98.2 | 99.6 | -------- | -------- | -------- | -------- | -------- | -------- | -------- |
| 90.5 | 94.3 | 95.1 | 96.3 | 97.7 | -------- | -------- | -------- | -------- | -------- | -------- | -------- |
| 93.2 | 96.1 | 96.9 | 97.8 | 98.6 | -------- | -------- | -------- | -------- | -------- | -------- | -------- |
| 90.4 | -------- | -------- | -------- | 99.7 | -------- | 84.0 | -------- | -------- | -------- | 89.8 | -------- |
| 86.9 | 92.4 | 94.1 | 96.2 | 98.3 | -------- | -------- | -------- | -------- | -------- | -------- | -------- |
| 91.3 | 93.7 | 94.6 | 95.4 | 96.8 | -------- | -------- | -------- | -------- | -------- | -------- | -------- |
| 89.1 | 92.7 | 94.1 | 95.8 | 97.3 | -------- | -------- | -------- | -------- | -------- | -------- | -------- |
| 92.5 | 95.7 | 97.0 | 98.2 | 99.7 | -------- | -------- | -------- | -------- | -------- | -------- | -------- |
| 90.6 | 94.4 | 95.0 | 96.3 | 97.6 | -------- | -------- | -------- | -------- | -------- | -------- | -------- |
| 93.1 | 96.2 | 97.0 | 97.9 | 98.6 | -------- | -------- | -------- | -------- | -------- | -------- | -------- |

TABLE III.—ANTIKNOCK EFFECTIVENESS OF METHYLCYCLOPENTADIENYL NICKEL NITROSYL

| Research Octane Number, g. Ni/gallon of fuel | | | | | Motor Octane Number, g. /Nigallon of fuel | | | | |
|---|---|---|---|---|---|---|---|---|---|
| 0 | 0.25 | 0.5 | 1.0 | 2.0 | 0 | 0.25 | 0.5 | 1.0 | 2.0 |
| 90.0 | 93.3 | 93.7 | 95.2 | 96.2 | 84.3 | 86.1 | 86.6 | 87.1 | 88.1 |

In addition to the above tests, tests were conducted on the fuel which contained 3 milliliters of tetraethyllead per gallon. In a fuel thus blended the addition of 1 gram of nickel as cyclopentadienyl nickel nitrosyl gave an increase of 3.4 octane numbers over that obtainable with the tetraethyllead alone. This increase represents an outstanding improvement in antiknock effectiveness. For example, when 1 gram of iron as iron carbonyl is added to this same fuel an increase of only 2.1 octane numbers is obtained.

Another advantage which the additives of this invention possess is their ability, when properly blended, to reduce the wear characteristics ordinarily encountered in the use of metallic antiknock agents. By the use of these compounds the wear ordinarily associated with metallic antiknocks and particularly iron-containing compounds is considerably elevated. The amount of wear can be determined by the rate of loss of weight by the upper piston ring according to the method disclosed in U.S. Patent 2,315,845. The method of this patent involves determining wear by incorporating a radio-active substance in the surface of the piston ring normally subjected to abrasive wear then abrading the surface in the presence of the lubricating oil which is capable of receiving abraded particles and then determining the radio-activity of the lubricating oil. Thus, the wear is determined after operation of the engine containing the radio-active piston rings. It is found that when compositions of this invention are employed considerably less wear is evidenced than when other metallic antiknocks are used in the absence of these compounds.

The cyclopentadienyl nickel nitrosyl coordination compounds employed in this invention can be added directly to the hydrocarbon fuel and the mixture subjected to stirring, mixing or other means of agitation until a homogeneous fluid results. In addition to the cyclopentadienyl nickel nitrosyl coordination compound the fuel may have added thereto antioxidants, metal deactivators, halohydrocarbon scavengers, phosphorus compounds, dyes, antirust and antiicing agents and supplementary wear inhibitors. The following examples are illustrative of the improved fuels of this invention and a method of preparing them.

EXAMPLE I

To a synthetic fuel consisting of 20 volume percent toluene, 20 volume percent isobutylene, 20 volume percent isooctane and 40 volume percent n-heptane is added cyclopentadienyl nickel nitrosyl, $C_5H_5NiNO$, in amount such that the nickel concentration is 0.05 gram per gallon. The mixture is agitated until a homogeneous blend of the cyclopentadienyl nickel compound in the fuel is achieved. This fuel has substantially increased octane value.

EXAMPLE II

To 1000 gallons of commercial gasoline having a gravity of 59.0° API, an initial boiling point of 98° F. and a final boiling point of 390° F. which contains 45.2 volume percent paraffins, 28.4 volume percent olefins and 25.4 volume percent aromatics is added 10.0 grams per gallon of nickel as methylcyclopentadienyl nickel nitrosyl to give a fuel of enhanced octane quality.

EXAMPLE III

Phenylcyclopentadienyl nickel nitrosyl is added in amount sufficient to give a nickel concentration of 6.0 grams per gallon to a gasoline having an initial boiling point of 93° F., a final boiling point of 378° F. and an API gravity of 56.2°.

EXAMPLE IV

To a liquid hydrocarbon fuel containing 49.9 volume percent paraffins, 15.9 volume percent olefins and 34.2 volume percent aromatics and which has an API gravity of 51.5°, an initial boiling point of 11° F. and a final boiling point of 394° F. is added cyclopentadienyl nickel nitrosyl to a nickel concentration of 3.0 grams per gallon.

EXAMPLE V

To the fuel of Example II is added methylcyclopentadienyl nickel nitrosyl in amount such that the nickel concentration is 2.0 grams per gallon.

EXAMPLE VI

To a gasoline having an internal boiling point of 81° F. and a final boiling point of 410° F. is added a mixture of octyl cyclopentadienyl nickel nitrosyl and methylcyclopentadienyl nickel nitrosyl such that the nickel concentration is 1.75 grams per gallon. This fuel is found to have excellent antiknock characteristics while imparting a minimum of wear to the engine in which it is employed.

EXAMPLE VII

Cyclopentadienyl nickel nitrosyl is added to an aviation gasoline having a final boiling point of 338° F. and a 50 percent evaporation temperature of 221° F. The compound is added such that the finished fuel contains 2 grams of nickel per gallon.

In each of the preceding examples the cyclopentadienyl nickel nitrosyl coordination compound possesses an inert gas structure in the outer electron shell of the nickel atom. Since nickel occurs in the fourth period of the Periodic Table, the resulting cyclopentadienyl nickel nitrosyl coordination compound has the electron configuration of the inert gas of that period, that is, krypton, atomic number 36. Therefore, in the expression $$A_n + 5x + py + qz = S$$

$S$ becomes 36. Since $A_n$ is within the parameters expressed by $(S_n - 10)$ and $(S_n - 6)$, that is, since the atomic number of nickel is 28 the atomic number of nickel can be substituted in the expression $A_n + 5x + py + qz = S$. Since there is one cyclomatic radical in the compound, $x$ is equal to 1 and likewise, since there is a single type of electron donor group, the nitrosyl group, $y$ is equal to 1 and $z$ is equal to 0. Thus, for each compound in the examples the expression $A_n + 5x + py + qz = S$ has been completely satisfied. For example, methylcyclopentadienyl nickel nitrosyl, $CH_3C_5H_5NiNO$, $$28 + 5(1) + 3(1) + 0 = 36$$

In some portions of the present and parent specification the cyclomatic radicals are shown by their empirical formulae. Thus, $C_5H_5$ represents a cyclopentadienyl radical, and $C_9H_7$ and $C_{13}H_9$ denote respectively an indenyl and fluorenyl radical. It is to be understood, however, that any of the general type of cyclomatic radicals described hereinbefore can be employed in the compounds constituting constituents of the fuels of the present invention.

The compounds of this invention are susceptible to preparation by a variety of methods and the following example is intended to serve as an illustration of one of these methods.

EXAMPLE VIII

Under a nitrogen atmosphere, 0.29 mole of dicyclopentadienyl nickel was dissolved in 500 ml. of petroleum ether boiling in the range of 38.5–50° C. Nitric oxide was bubbled into the dicyclopentadienyl nickel solution for 1.5 hours. After stirring for one hour, brown-green solids settled out, leaving a dark red solution which was filtered. The red filtrate was distilled in a helix-packed column at atmospheric pressure to remove most of the petroleum ether. The remainder was removed under slightly reduced pressure. Fractionation yielded 30 parts of cyclopentadienyl nickel nitrosyl representing 55.8 percent conversion based on the dicyclopentadienyl nickel. This stable, volatile, gasoline-soluble product is a deep red liquid boiling at 56.5° C./22 mm.

*Analysis.*—Calc. for $C_5H_5NiNO$: Ni, 38.2. Found: Ni, 37.6.

The lubricating of rubbing systems which operate at extreme pressures presents unusual lubricating problems since the lubricant film between the rubbing surfaces is subject to high shear forces. Because of these high shear forces, the lubricant films which, under low pressure operating conditions are present upon the surfaces of the rubbing members, are forced from between the rubbing surfaces. In order to combat these problems accompanying extreme pressure conditions, it has been the practice of the prior art to utilize lubricant additives which corrode the rubbing surfaces so as to form a film on the surfaces which, in itself, acts as a lubricant. Such additives are spoken of in the art as E.P. additives.

A typical example of such an E.P. additive is carbon tetrachloride which breaks down in a lubrication system to form degradation products that react with the iron oxide coating on a ferrous rubbing member to form a film of ferric chloride which acts to lubricate the rubbing metal surfaces. Since the lubrication mechanism of E.P. additives involves corrosion of the rubbing members, these additives have no lubricating effect in rubbing systems in which the rubbing members have relatively non-reactive surfaces which resist corrosion by the additive. Typical examples of such non-reactive rubbing systems are titanium-on-titanium, stainless steel-on-stainless steel, and gold-on-gold. The non-reactivity of the rubbing surfaces may be due to the resistance to corrosion of the material forming the rubbing members as is the case of gold rubbing on gold wherein the gold is essentially inert to any chemical reaction. Further, it may be due to the non-reactivity of an oxide film which is present on the surfaces of the rubbing members as in the case of titanium-on-titanium, since titanium readily forms a surface oxide coating which is extremely non-reactive. An example of a non-metallic rubbing system in which the rubbing members are non-responsive to E.P. additives is nylon rubbing on nylon, since then nylon is substantially chemically inert. Other plastics which cannot be lubricated by E.P. additives are the polymethyl methacrylates, polyvinyl chloride and polyethylene.

The fuels and lubricants used in today's high compression automotive engines cause deposits to be formed during combustion. These deposits which are derived from the fuels and lubricating oils and the additives therein collect on essentially all parts of the combustion chamber including the valves, the spark plugs and the cylinder walls. The formation of these deposits leads to several problems.

When a new engine is operated before combustion chamber deposits have had a chance to build up, the engine is found to have a certain octane requirement. As it is operated, the octane requirement gradually increases as deposits are built up. After a certain operating time the deposits reach a state of equilibrium in which the rate of their build-up is equalled by the rate of their removal by one means or another. When this happens, the octane requirement of the engine has become stabilized and levels off at essentially a constant value. This equilibrium requirement of the engine is frequently as much as 12 to 15 octane numbers above that of the clean engine before deposit formation. This necessitates the use of gasoline of unnecessarily high octane number for knock-free performance of the car.

When compounds formed by the burning of fuel, lubricating oil and their additives are deposited on the insulator of the spark plugs, these deposits provide an alternate path from the center electrode to the ground electrode. If the resistance of deposits which form this path is sufficiently low the loss of electrical energy through the deposit may prevent the voltage from rising to that required to fire the plug. Such a fouled plug will normally misfire throughout the speed range of the engine resulting in poor acceleration, engine roughness, reduced top speed of the vehicle and high consumption of the fuel.

Deposit-induced ignition (surface ignition) results when glowing combustion chamber deposits ignite the fuel charge at a time other than when it would be ignited by the spark plug. Such ignition may result in wild erratic knock or engine roughness which is objectionable to the motorist. When the antiknock quality of a fuel has to be increased to suppress such combustion this represents a waste of octane numbers. Surface ignition also prevents the engine designed from making optimum use of antiknock quality in combustion chambers requiring close combustion control.

It, is, therefore, another object of this invention to provide natural or synthetic base lubricants, either greases or oils, with improved lubricity characteristics. A more particular object of this invention is to provide natural or synthetic base lubricant compositions which are particularly efficacious in lubricating rubbing systems operating under extreme pressure conditions in which the rubbing systems are non-corrodable by conventional E.P. additives. A further object is the provision of natural or synthetic base lubricants containing organometallic compounds whose presence serves a dual function in providing the lubricant composition with increased lubricity as compared to the base lubricant component and in further serving as an antiknock additive agent which, when the lubricating composition finds its way into the combustion chamber of an internal combustion engine and is burned there, acts to reduce knock and as well octane requirement increase of the engine. It is another object of this invention to provide new compositions of matter. Among the other objects of this invention are the alleviation of engine problems including octane requirement increase, spark plug fouling and surface ignition. Still further objects will be apparent from the ensuing description.

In the accomplishment of some of the above objects, it has been found that the lubricity of natural and synthetic base lubricants may be greatly enhanced by adding thereto a cyclopentadienyl nickel nitrosyl compound of the type described above, which is effective in producing an anti-wear action on the rubbing surfaces during operation. Although the invention is not limited to any particular mechanism of anti-wear action, it is believed that a film is formed on the rubbing surfaces substantially from the degradation of the organometallic additive under the influence of heat and pressure generated at the contact points between the rubbing surfaces. Thus, the film is formed independently of any corrosive mechanism as required in the case of conventional E.P. additives and, accordingly, the film is effective in lubricating surfaces which are essentially non-reactive and have a high resistance to corrosion.

The cyclopentadienyl nickel nitrosyl additive can be present in the base lubricant in various concentrations and in various forms of dispersion. In the case of a natural or synthetic grease as the base material, it may be present in the form of well-dispersed, finely-divided particles, whereas in the case of a natural or synthetic oil serving as the base lubricant, it is ordinarily soluble in the oil so as to form a solution. In principle, the higher the concentration of the additive in the base lubricant, the greater is the lubricating power of the product obtained. Experience has shown, however, that very low concentrations of the order of 0.1 percent by weight of the additive in the base lubricant increase its lubricity. In view of the high cost of the nickel compounds, there is an economic limit to their concentration in the base lubricant, a limit which could be fixed at 10 percent by weight of nickel in the present state of economic conditions. Moreover, when the concentration of the additive is increased to above 10 percent, the physical properties, for example, viscosity, of the resulting composition may be markedly changed from those of the base lubricant so that the desirable physical properties of the base lubricant may be reduced. In fact, with extremely high concentrations of the additive a situation can be reached wherein the base lubricant is in effect the additive and the nickel compound is the base fluid, since the physical properties of the resulting composition are more like those of the organonickel component than like the base lubricant. Thus, the preferred concentration range of the invention ranges from about 0.1 to about 10 percent by weight of the cyclopentadienyl nickel nitrosyl in the base lubricant.

In general, the cyclomatic nickel compounds as set forth above are found to be satisfactory lubricity improvers in a wide variety of natural and synthetic lubricant bases. By way of illustration, they improve the lubricity of mineral oils and greases; silicon-containing oils and greases including the siloxanes, silanes, and silicate esters; fluorocarbon oils and greases; the diesters as, for example, di-sec-amyl sebacate and di-2-ethylhexyl azelate; and synthetic oils, such as the polybutene oils, polyolefin oils utilizing olefins other than butene of relatively low molecular weight, polyalkaline glycol oils and tetrahydrofuran polymer oils.

The mineral oils and greases include hydrocarbon oils and greases obtained through conventional refining processes of the petroleum crude stocks. Such conventional refining processes include distillation, solvent extraction, clay filtration, de-waxing, acid treatment and propane deasphalting. The constituents of mineral oils and greases may be summarized as (1) straight chain paraffins, (2) branched chain paraffins, (3) naphthenes, (4) aromatics, and (5) mixed aromatic-naphthene-paraffin.

The silicon-containing oils and greases include the polysiloxane oils and greases of the type, polyalkyl, polyaryl, polyalkoxy, and polyaryloxy, such as the polymethyl siloxane, polymethylphenyl siloxane and polymethoxyphenoly siloxane. Further included are silicate ester oils, such as the tetralkyl and tetraryl silicates of the tetra-2-ethylhexyl and tetra-p-tert-butylphenyl types and the silanes, such as the mono-, di-, and tri-silanes. Also included are the chlorinated siloxanes, such as the chlorophenyl siloxanes.

The fluorocarbons are linear polymers built up of a recurring unit which is

The fluorocarbon oils and greases are very stable chemically, have high thermal stability, and are quite resistant to oxidation. These desirable physical properties appear to be closely related to the bond distances occurring in the fluorocarbon polymeric molecule. The addition of more than one fluorine atom to a carbon atom shortens the carbon-fluoride bond and also the carbon-chlorine bond, and forms a more compact molecule which makes substitution more difficult and results in the high physical and chemical stability achieved by these lubricants.

The diester oils and greases are esters formed by the reaction between dibasic acids and alcohols. The diesters of branched chain aliphatic alcohols and straight chain dibasic acids have been found to have the most desirable combination of properties for lubricating purposes. The synthetic diesters have high viscosity indices, high flash points, and exceptionally low pour points as compared to petroleum oils of similar viscosity and have found use chiefly as aircraft instrument oils, hydraulic and damping fluids, and precision bearing lubricants wherein their exceptionally low temperature fluidity properties are particularly suited.

By way of illustration only, there are presented hereinafter examples of lubricant compositions falling within the scope of the present invention. Unless otherwise specified, proportions given in these examples are on a weight basis.

EXAMPLE IX

Five parts of methylcyclopentadienyl nickel nitrosyl are blended with 95 parts of Mid-Continent, solvent-extracted, propane de-waxed, mineral oil having a sulfur content of 0.17 percent and a viscosity index of approximately 95.

EXAMPLE X

Three parts of cyclopentadienyl nickel nitrosyl are blended with 97 parts of a polymethylpolyphenyl siloxane grease. The siloxane grease is Dow-Corning 44 silicone grease of medium weight consistency having a penetration of 240–280 (ASTM 217–48), a minimum melting point of 400° F., and a serviceable temperature range of −30 to 400° F.

EXAMPLE XI

Seven parts of cyclopentadienyl nickel nitrosyl are blended with 93 parts of a halogen-substituted polyphenylpolymethyl siloxane. The siloxane fluid is Dow-Corning F-60 fluid having a viscosity of 71 centistokes at 25° C. and 24 centistokes at 75° C., a specific gravity of 1.03 at 25° C., a freezing point of −70° C. and a flash point of 540° F.

EXAMPLE XII

To 10,000 parts of a wholly-distilled, mixed-base solvent-refined lubricating oil having a specific gravity of 28.9° API, a viscosity grade of SAE 10W–20 and a viscosity index of 135.7 is added 100 parts of stearoyl cyclopentadienyl nickel nitrosyl and the mixture is stirred until a homogeneous solution is obtained.

EXAMPLE XIII

Two parts of cyclopentadienyl nickel nitrosyl are blended with 98 parts of Fluorolube T–45 made by the Hooker Electrochemical Company. Fluorolube T–45 has the general formula $(CF_2CFCl)_x$ and has an average molecular weight of 880. Its pour point is 5° C. and it has a viscosity of 45 centistokes at 160° F.

EXAMPLE XIV

Ten parts of cyclopentadienyl nickel nitrosyl are mixed with 90 parts of Emolein 2957 which is diisooctyl azelate and is manufactured by Emery Industries, Inc. Emolein 2957 has a viscosity of 7000 centistokes at −65° F. and a viscosity of 3.34 centistokes at 210° F. (ASTM 445–52T). It has a flash point of 425° C. (ASTM D92–52) and a pour point of −85° F. (ASTM D97–47).

EXAMPLE XV

Five parts of cyclopentadienyl nickel nitrosyl are blended with 95 parts of diethylhexyl sebacate which has a viscosity of 210° F. of 3.32 centistokes, a viscosity of 187 centistokes at 0° F., a pour point of −70° F. and a gravity of 22.8° API.

Effectiveness of the lubricant compositions containing a cyclomatic nickel nitrosyl compound and a natural or synthetic base lubricant as defined above can be demonstrated by testing in a four-ball wear machine to determine the lubricity of the respective lubricant compositions relative to a baseline of the neat natural or synthetic oil or grease. The four-ball wear machine is described by Larsen and Perry in the "Transactions of the A.S.M.E.," January 1945, pp. 45–50. The four-ball wear machine operates in the load range of 0.1 to 50 kilograms and can measure loads to a tenth of a kilogram.

The four-ball wear machine utilizes four balls of equal size arranged in an equilateral tetrahedral formation. The bottom three balls are held in a non-rotatable ball holder which is essentially a universal chuck that holds the balls in abutting relation to each other. Since the bottom three balls are of equal size, their centers form the apices of an equilateral triangle. The top ball is affixed to a rotatable spindle whose axis is positioned perpendicularly to the plane of the ball holder and in line with the center point of the triangle whose apices are the centers of the three bottom stationary balls.

In operation, the four balls are immersed in the lubricant composition to be tested and the ball holder is moved upwardly so as to bring the three fixed lower balls into engagement with the upper rotating ball. As the load is increased, the ball holder is moved upwardly and axially of the rotating spindle affixed to the upper ball.

The lubricity of the lubricant under test is determined by the amount of wear occurring at the contact points between the upper rotating ball and the three fixed lower balls under the conditions of the test. If the lubricant is completely effective, the amount of wear will be negligible. On the other hand, if the lubricant is not completely effective under the test conditions, the upper ball may fuse to the lower balls due to the heat of friction at the contact points or the upper ball may form circular scars in the lower balls along their line of contact. If scars are formed in the lower balls, the average diameter of the circular scar is measured so as to give a quantitative basis for comparing the test results with those of other tests in which circular scars were formed. As the severity of the test conditions are increased with a given lubricant composition, the likelihood of scarring the lower balls is increased. Thus, the formation of scars does not indicate that the lubricant composition is unsatisfactory, but rather serves only to indicate its degree of effectiveness under certain test conditions.

The effectiveness of the lubricant compositions of the invention is found to be superior to that of neat natural and synthetic lubricants by the four ball test.

For example, when ten parts of cyclopentadienyl nickel nitrosyl are added to 90 parts of Emolein 2957 to give the composition of Example XIV, and this composition is tested in the manner set forth above, it gives superior results as compared with the neat Emolein 2957 not containing the cyclomatic organometallic additive.

When other lubricant compositions of the invention other than those set forth in the preceding examples are tested, similar results are obtained in that the compositions are superior lubricants and result further in markedly reducing the octane requirement of an internal combustion engine.

We claim:

1. As a new composition of matter, a liquid hydrocarbon fuel of the gasoline boiling range for spark ignition internal combustion engines containing from about 0.05 to about 10 grams per gallon of nickel as a cyclopentadienyl nickel nitrosyl wherein the cyclopentadienyl radical is a cyclopentadienyl hydrocarbon radical containing 5 to about 13 carbon atoms.

2. The composition of claim 1 wherein said cyclopentadienyl nickel nitrosyl is cyclopentadienyl nickel nitrosyl, $C_5H_5NiNO$.

References Cited by the Examiner
UNITED STATES PATENTS

| | | | |
|---|---|---|---|
| 2,086,775 | 7/1937 | Lyons et al. | 44—68 |
| 2,235,466 | 3/1941 | Peski et al. | 44—68 |
| 2,272,133 | 2/1942 | Shappirio | 252—49.7 |
| 2,375,236 | 5/1945 | Miller | 44—68 |
| 2,409,167 | 10/1946 | Veltman | 44—68 |
| 2,680,758 | 6/1954 | Thomas | 252—386 |
| 2,763,617 | 9/1956 | Scott et al. | 252—49.7 |
| 2,810,737 | 10/1957 | Haven | 44—68 |
| 2,831,880 | 4/1958 | Benkeser | 252—386 |
| 2,835,686 | 5/1958 | Graham | 44—68 |
| 2,849,470 | 8/1958 | Benson | 44—68 |
| 2,849,471 | 8/1958 | Thomas | 44—68 |
| 3,006,742 | 10/1961 | Brown et al. | 252—386 |

FOREIGN PATENTS 1,095,084   5/1955   France.

DANIEL E. WYMAN, *Primary Examiner.*